Figure 1:
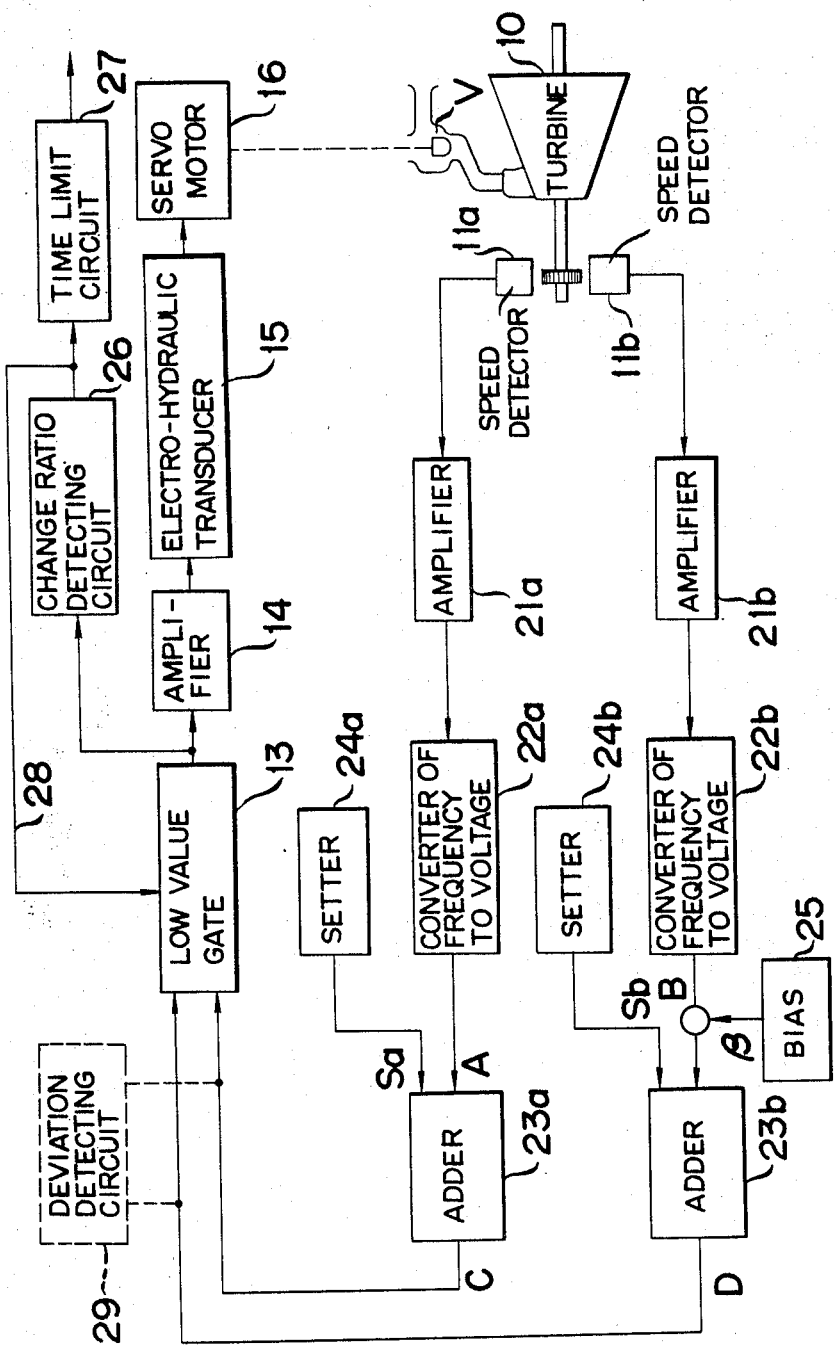

United States Patent

[11] 3,578,871

[72] Inventor Tetsuzo Sakamoto
 Yokohama-shi, Japan
[21] Appl. No. 797,131
[22] Filed Feb. 6, 1969
[45] Patented May 18, 1971
[73] Assignee Tokyo Shibaura Electric Co. Ltd.
 Kawasaki-shi, Japan
[32] Priority Feb. 9, 1968
[33] Japan
[31] 43/7746

[54] CONTROL DEVICE FOR AN OBJECT SUCH AS A ROTOR IN A PRIME MOVER OR THE LIKE
14 Claims, 3 Drawing Figs.
[52] U.S. Cl. .................................................. 415/10,
 60/39.09, 318/18
[51] Int. Cl. ...................................................... F01b 25/00,
 H02p 1/54
[50] Field of Search.......................................... 60/39.09;
 415/10; 318/71, 59, 20.000, 20.075, 20.080

[56] References Cited
UNITED STATES PATENTS
3,104,524 9/1963 Flanders...................... 60/39.09
3,138,750 6/1964 Borger et al. ................. 318/20.070
3,274,443 9/1966 Eggenberger et al. ........ 415/10

Primary Examiner—Mark M. Newman
Assistant Examiner—R. E Gluck
Attorney—Flynn and Frishauf ABSTRACT: A fail-safe control device for controlling an object such as a rotor of a turbine comprising first and second control systems and a low value gate selecting the output from either of the two control systems which has a safer value. The output of the low value gate is used to control the object, such as the rotor. A change ratio detecting circuit is provided for locking the function of the low value gate when the change ratio of the variable being controlled exceeds a predetermined value.

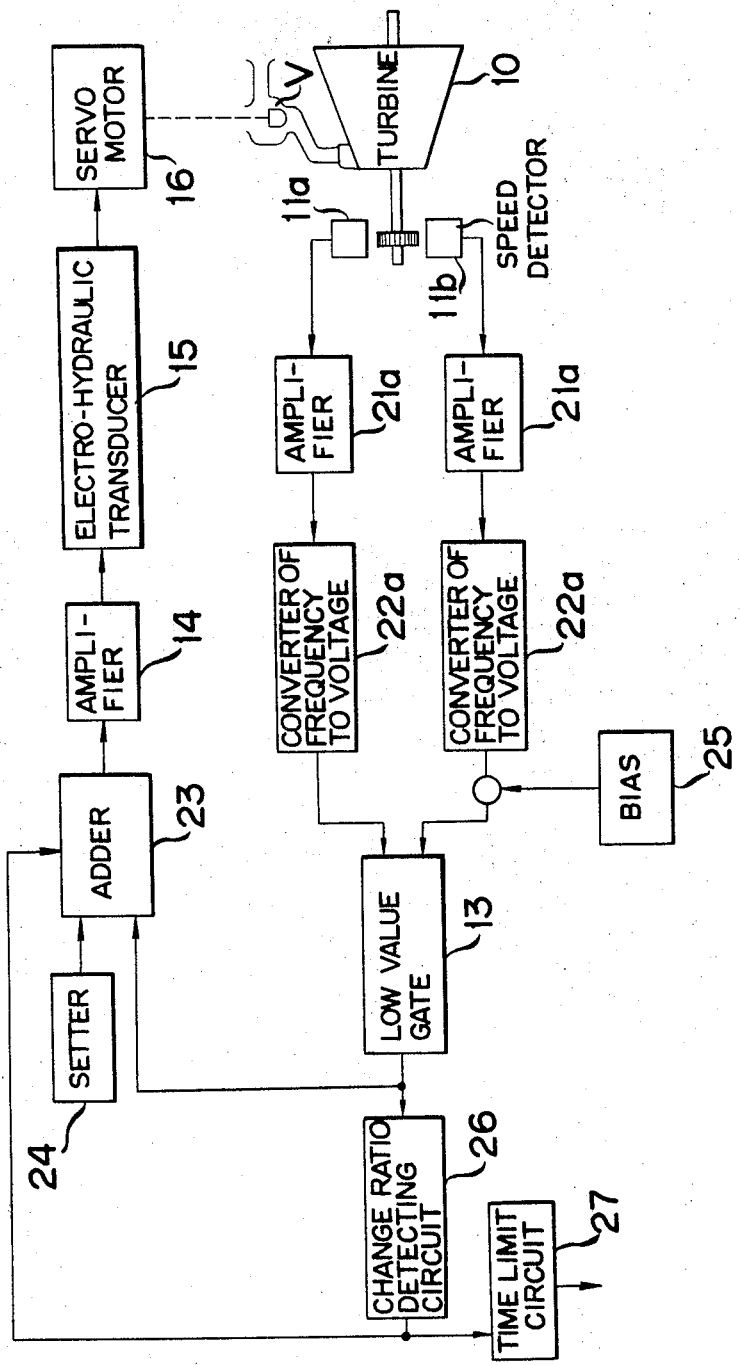

CONTROL DEVICE FOR AN OBJECT SUCH AS A ROTOR IN A PRIME MOVER OR THE LIKE

The present invention relates to a control device for controlling in accordance with the value of desired control variables an object device in closed loop control for which the so-called "fail safe" condition is demanded.

In recent years, the trend has been to use electrical rather than mechanical devices for controlling a rotor having an appreciably great inertia, such as a rotor used in a prime mover, for example, a steam turbine, gas turbine, hydraulic turbine, or motor. It has been the general practice to install two control systems in juxtaposition to control one rotor in order to increase the reliability of control. For instance, where the velocity of a steam turbine is controlled, there are provided a pair of speed detectors and each output therefrom, which corresponds to the velocity of the turbine, is supplied to a pair of control devices. Then outputs from the control devices are introduced into a low value gate. An adjusting valve means is controlled in accordance with the output signal from the low value gate which corresponds to one of the paired outputs from the control devices.

One of the paired speed detectors and one of the paired control devices constitute one control system (hereinafter referred to as the first system). The other of said detectors and the other of said control devices constitute the other control system (hereinafter referred to as the second system).

If the first system fails and generates outputs that will improperly open the adjusting valve (hereinafter referred to as the high outputs), these high outputs are obstructed by a low value gate and only the outputs from the properly operating second system are actually used in controlling the turbine velocity. Where the failure of the first system results in the issuance of such outputs as will excessively close the adjusting valve (hereinafter referred to as the low outputs), outputs from the first system are supplied in preference to those from the second system, so that the turbine is so controlled as to stand at rest, though the second system is in a normal operating condition. Once, therefore, the turbine stops, its restart will not only require much time, but also, unforseeable losses occur. Consequently, even in the last mentioned case, it is desirable to continue the turbine operation by changing over to the normally operating second system. At the present moment, however, there is not available any suitable control device in this particular field.

The main object of this invention is to provide a control device which overcomes the above drawbacks.

SUMMARY OF THE INVENTION

According to the present invention, a device for controlling an object device, such as a rotor, requiring a fail-safe control, comprises first and second control systems, a low value gate selecting the output from either of the two control systems which has a safer value and issuing an output, thereby to control the operation of said object device. The advantages of the present invention are that the first and second control systems are utilized more effectively, eliminating unnecessarily bringing the object device to rest.

A feature of the invention is that the control device is capable of detecting increased deviations arising between the first and second control systems during long years of use, using a deviation detecting circuit.

Figure 2:
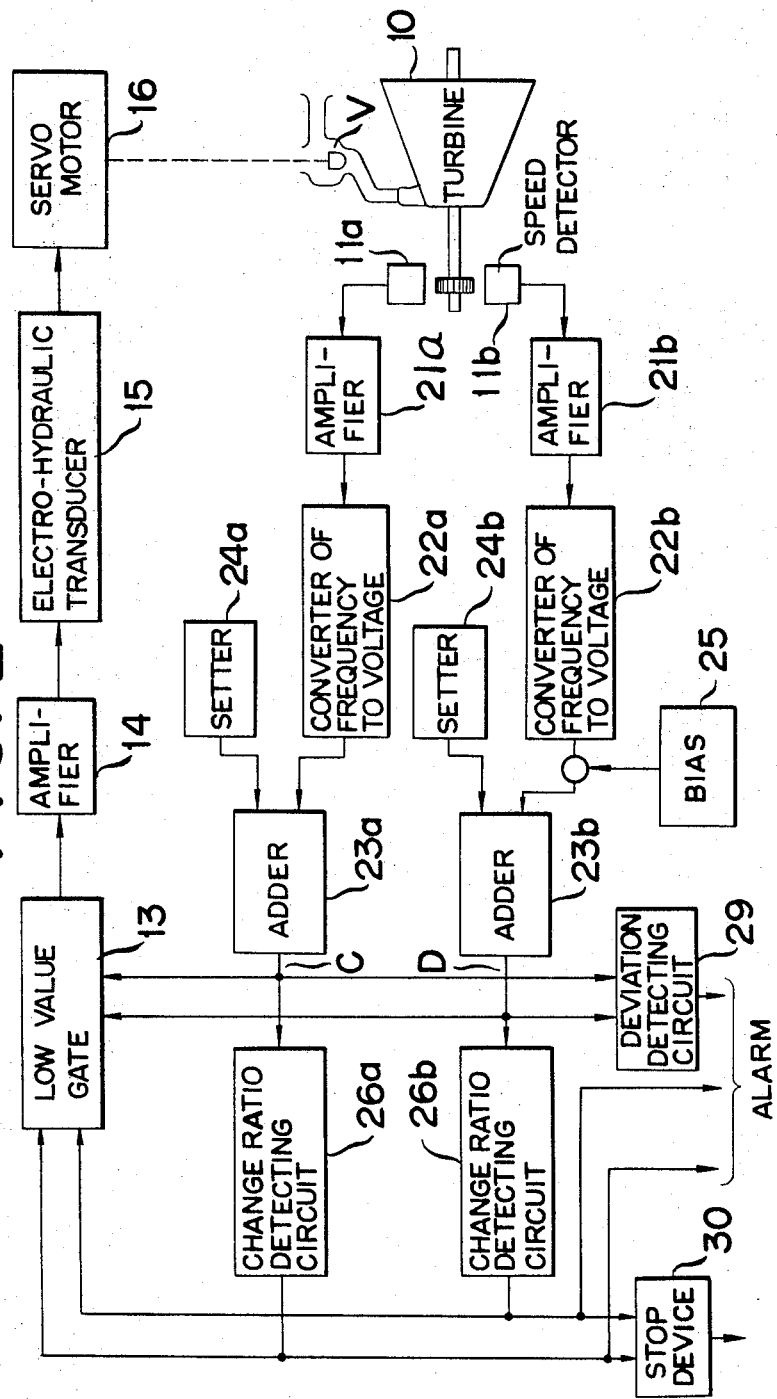

The invention will now be described in conjunction with preferred embodiments thereof with reference to the accompanying drawings, in which:

FIG. 1 is a block diagram illustrating an embodiment of the present invention; and FIGS. 2 and 3 are block diagrams representing other embodiments of the invention.

Referring to FIG. 1 showing a first preferred embodiment of the invention, outputs from speed detectors 11a and 11b for detecting the velocity of a steam turbine 10 in the form of frequency are amplified by amplifiers 21a and 21b, respectively, and supplied to converters of frequency to voltage 22a and 22b, respectively, to be converted to voltages having a magnitude proportionate to the turbine velocity. Hereinafter, the outputs of converters 22a and 22b will be referred to as to speed signals. The speed detector 11a, amplifier 21a, converter of frequency to voltage 22a and later described adder 23a constitute a first control system. The other speed detector 11b, amplifier 21b, converter of frequency to voltage 22b and adder 23b form a second control system. The function of these first and second control systems is substantially the same in their normal operation. In the first system there are supplied to the adder 23a a speed signal from the converter 22a (hereinafter referred to as the speed signal A) and an output Sa from a speed setter 24a which provides a reference signal which has an opposite polarity to that of the speed signal A. The absolute values of the signals Sa and Sb are equal to the absolute values of the speed signals A and B when the turbine is operating at the desired speed. The sum of the speed signal A and the setting signal Sa is introduced into a selecting means or a low value gate 13. For example, when the rotational speed of the turbine 10 assumes the value equal to the specified value of the setter 24a, the output signal C from the adder 23a will be zero. When the rotational speed thereof assumes the value lower than that specified, a positive polarity output signal C will result. When the rotational speed thereof assumes the value higher than that specified, a negative polarity output signal C will result. Thus, the absolute value of the magnitude of the speed will be a function of the deviated value from the specified value. On the other hand, the second system causes the adder 23b to sum up the speed setting reference signal Sb and the speed signal B from the converter 22b to which has been added a bias signal $\beta$ from a bias source 25. The output signal D of adder 23 b is supplied to a low value gate 13. The bias signal $\beta$ is intended to set the magnitude of the control signal from the first system at a value lower, by, a predetermined amount, than the control signal from the second system, (that is, a value on the safer side, namely, a value to bring the adjusting valve to a slightly closed state). The speed setter 24b of the second system is of the same type as the speed setter 24a of the first system, both setters issuing the same reference signal for an equal speed setting.

According to the aforementioned arrangement, therefore, there is always sent forth by the low value gate 13 an output corresponding to the control output C from the adder 23a of the first system, so long as the first and second systems remain normal, in preference to an output from the adder 23b of the second system, namely, the control output D therefrom. Output signals from the low value gate 13 are conducted through the amplifier 14, electrohydraulic transducer 15 and servo motor 16 so as to control the adjusting valve means V of the turbine 10. Numeral 26 denotes a change ratio detecting circuit which issues an output in case the change ratio of the control signal from the low value gate 13 exceeds a predetermined value.

Where the change ratio of the control signal is large enough to actuate the change ratio detecting circuit 26, outputs therefrom cause the low value gate to cease its original function so that it only allows output signals from the second system to be conducted to the amplifier 14. Again where outputs from the change ratio detecting circuit 26 continue to be sent forth for a longer time than specified, a time limit detecting circuit 27 issues outputs to close the adjusting valve V.

As the general arrangement of a preferred embodiment of the control device according to the present invention has been explained, there will now be described its operation. The first system is so designed to issue control outputs C which have a sufficiently high value towards the nonsafe side that is, outputs which tend to cause valve V to open to increase the speed of the turbine. The second system is so arranged as to send forth control outputs D which have a sufficiently low value towards the safe side that is, tending to cause valve V to close to lower the speed of the turbine. Where both the first and second systems remain normal, the adjusting valve of the turbine 10 is controlled in accordance with the control output C from the first system. Thus, if the first system breaks down, its control output C will assume a high value, with the result that the low value gate 13 only allows the passage of the control output D from the second system to control the valve. In this case, the controlling property suffers variations corresponding to the deviation $\beta$ displayed by the second system from the first system. However, if the value of $\beta$ is confined within an allowable range, for example, within an allowable range of momentary variations in the rotation velocity of the turbine, then there will not occur any substantial malfunction. Thus in case the first system fails, the normally operating second system allows an object device to be continued in operation at a speed slightly different from nominal speed. Since such operation by the second system is originally an abnormal case, there is given an alarm by means to be described hereinbelow. If, in such case, the second system, too, should break down, its control output D will assume a sufficiently low value to bring the adjusting valve of the turbine 10 to a closed state with the eventual stopping of the turbine. Where the control output D from the second system should by chance be raised to a high value as a result of its failure, then the adjusting valve of the turbine 10 will be widely opened to bring about a dangerous condition. To prevent the occurrence of such danger, therefore, there is installed the change ratio detecting circuit 26. During the normal operation of the turbine, a signal for controlling the adjusting valve will not increase in value over a specified change ratio. This is because the inertia of the turbine confines variations in its rotation velocity to within a certain limit. Accordingly, where the control signal fed to the adjusting valve varies in excess of a specified amount, there will be sent forth an output by the change ratio detecting circuit 26, thereby to detect any abnormality occurring in the control system.

If outputs from the change ratio detecting circuit 26 continue to be issued longer than specified, then the time limit circuit 27 will generate an output. This output will close the adjusting valve to stop the turbine 10.

There will now be described the case where the second system remains normal, whereas and the first system malfunctions and issues control outputs C of a low value. However, since the output C from the first system is so designed in principle as to have a high value at the time of malfunction, the aforementioned event is an extremely rare case. When the control output C falls to a low value due to a malfunction in the first system, there results a high change ratio, causing the change ratio detecting circuit 26 to be actuated. The output from said detector 26 is fed to the low value gate 13, as shown by a line 28 in FIG. 1, to thereby cause only the control output D from the second system to pass through said gate, thus enabling the turbine to continue its operation under control of the normal second system. Operation by the second system alone is carried out in the same manner as previously outlined and a detailed description thereof is omitted. In the event that the control output C from the first system has a low value and yet the change ratio thereof is too small to actuate the change ratio detecting circuit 26, it is impossible to allow the turbine to be operated solely by the normal second system. As described above, however, the fall of the control output C from the first system to a low value due to its failure is a rare case. Though the control of the turbine can not in such a rare case be changed over to that by the normal second system, the turbine is so controlled as to be brought to rest, namely, to be kept in a fail safe state.

There will now be described the case where the first system is normal, while the second system is abnormal (i.e., malfunctions). If, in such case, the control output D from the second system assumes a high value, the operation of the turbine 10 is controlled by the control output C from the first system in exactly the same way as before the occurrence of abnormalities in the second system, namely, as in the case where both first and second systems are normal. If the control output D from the second system is reduced to a low value in the case where the first system is normal and the second system is abnormal, then the output D from the second system is passed in preference through the low value gate 13, so that the operation of the turbine 10 is so controlled as to stand at rest.

Further, as shown by the broken lines of FIG. 1, there may be additionally provided a deviation detecting circuit 29 which is actuated to detect deviations between the control output C from the first system and the control output D from the second system when they exceed those defined by the bias value $\beta$, enabling an alarm to be given when either of the two systems presents an abnormality in the operating thereof.

It will be apparent that if outputs from the speed setter 24b are deviated in advance from those from the speed setter 24a instead of providing a bias source 25, then the same object can be attained without providing a bias source 25.

According to the embodiment of FIG. 2, if the control output from one failing system of the two assumes a higher or lower value than the other normal system, the turbine operation can be maintained by the other normal system. Corresponding parts of FIG. 2 and FIG. 1 are denoted by the same reference numerals, and there will be described only the different points between the two embodiments. In FIG. 2 there are provided change ratio detecting circuits 26a and 26b for the control output C from the first system and the control output D from the second system respectively. Outputs from said detectors 26a and 26b are used to control the low value gate 13. Further, if both detectors 26a and 26b send forth outputs, this event can be detected by a simultaneous actuation detecting circuit (stop device) 30 so as to stop the turbine operation.

When the output C from the first system decreases at a higher rate than specified, the change ratio detecting circuit 26a causes the low value gate 13 to allow preferentially the passage of the control output D from the second system. Where, on the other hand, the output D displays a change toward low values at a higher ratio than specified, then the change ratio detecting circuit 26b is operated, causing the low value gate 13 to pass the control output C from the first system. In the embodiment of FIG. 1, if the control output D from the second system assumes a lower value than the normal as a result of its failure, it is impossible to change over the turbine operation to control by the first system alone. However, the embodiment of FIG. 2 allows such a change when the second system breaks down.

The first system is so designed as to cause its control output C to assume a high value at the time of its failure. Therefore, if the first system breaks down during the turbine operation when control is solely by the first system, it is likely that an accident would occur. In such case, however, the change ratio detecting circuits 26a and 26b will issue an output, so that the simultaneous actuation detecting circuit 30 which detects the generation of an output from both detectors 26a and 26b also sends forth an output to cause the turbine to be safely stopped. Thus, the occurrence of accidents is prevented.

The change ratio detecting circuits 26a and 26b can detect a sudden occurrence of abnormalities in the first and second systems (i.e., malfunction of systems or wrong speed of turbine, etc.) but can not trace (or detect) the slowly varying behavior of the constituent elements of said system during long years of use. However the deviation detecting circuit 29 can carry out the required detection of such failure and give an alarm thereon. This discussion of course also holds true for the embodiment of FIG. 1.

Where control is intended for a constant velocity operation as is demanded of a steam turbine for power generation, it is possible to determine the priority of outputs from the first and second systems solely by the deviation detecting circuit 29 without using the change ratio detecting circuits 26a and 26b.

FIG. 3 is another embodiment of the present invention. In this embodiment, the first and second systems respectively cover sections up to the converters of frequency to voltage 22a and 22b. The subsequent section of the circuit starting with the adder 23 represents a single system, the rest of the arrangement being the same as in the embodiment of FIG. 1.

This embodiment uses only a single adder 23. The connections of the adder 23, the low value gate 13 and the change ratio detecting circuit 26 are modified with respect to FIG. 1. However, system operation is similar to those previously described and should be apparent. Therefore a detailed description thereof is omitted.

The control devices according to the present invention, which comprises two systems of apparatus for increased reliability causes the output from either of these systems which has a value on the safe side to be used for control purposes. One of the control outputs from the two systems is deviated in advance from the other by a predetermined amount to provide improved results.

In contrast, with the prior art control device, divergences occurring in sampling by the speed detector caused control outputs to be sent forth by either the first or second system at random even when both systems were normally operating. This was undesirable from the standpoint of maintaining the controlling properties of the entire apparatus, as well as from the standpoint of preserving the life of the low value gate. In contradistinction to this, when both systems are normal, the present invention always allows only one of the system outputs to be preferentially used for control, thereby eliminating the drawbacks of the prior art devices.

It will be understood that the present invention is not restricted to the above-mentioned embodiments, and that various modifications may be made, including, for example, application in controlling the pressure and temperature of materials used as a source of motive power with the view to eventually controlling the velocity of a prime mover or the like.

I claim:

1. A fail-safe control device for controlling a variable associated with the operation of an object device comprising:
    a first control system for generating a first control signal which is a function of the value of said variable associated with said operation of said object device;
    a second control system for generating a second control signal which is a function of deviation of said variable associated with said operation of said object device;
    a selecting means coupled to said control systems for selecting one of said first or second control signals which has a value that would cause said controlled variable to change in a safe-operation direction, and for passing said selected signal in preference;
    a change ratio detecting means for locking said selecting means so as to cause it always to pass the other of said control signals when the rate of change of a signal corresponding to the output of said selecting means exceeds a predetermined value; and
    means for controlling said object device in accordance with the control signal passed by said selecting means.

2. Apparatus according to claim 1 comprising means for terminating operation of said object device when said change ratio detecting means is actuated continuously for longer than a predetermined time.

3. Apparatus according to claim 1 wherein said change ratio detecting means is directly responsive to said control signals.

4. Apparatus according to claim 1 wherein said change ratio detecting means further causes said selecting means to pass said one control signal in preference where the change ratio of a signal corresponding to said another control signal exceeds a predetermined value.

5. Apparatus according to claim 4 comprising means for terminating the operation of the object device when the change ratio of said signals corresponding to both of said first and second control signals exceed said predetermined values.

6. Apparatus according to claim 1 further comprising means for detecting deviations between said first and second control signals; and means for indicating that said deviation exceeds a predetermined limit.

7. Apparatus according to claim 6 further comprising means for detecting deviations between said first and second control signals; and means for indicating that said deviation exceeds a predetermined limit.

8. Apparatus according to claim 1 comprising means for adding a signal having a predetermined value to one of said control signals to cause said selecting means to pass the other of said control signals during normal operation.

9. A fail-safe control device for controlling the velocity of a rotating member, such as a rotating section of a prime mover, comprising:
    means for detecting the velocity of said rotating member;
    first and second control systems for generating first and second electrical control outputs which are a function of the velocity of the rotating member, said first electrical control output having a value to control the operation of the rotating member at a velocity slightly lower by a specified value than that provided by the second electrical control output;
    selecting means for selecting either the first or second control output which will control the velocity of the rotating member to a lower velocity, and passing said selected output in preference;
    change ratio detecting means for locking said selecting means so as to cause it always to pass the other control output in preference, when the rate of change of a signal corresponding to one of said control outputs exceeds a predetermined value; and
    means controlling the velocity of the rotating member in accordance with the control output preferentially passed by said selecting means.

10. Apparatus according to claim 9 comprising means for terminating the operation of said prime mover when said change ratio detecting means is actuated continuously for longer than a predetermined time.

11. Apparatus according to claim 9 comprising means for stopping the operation of said prime mover when signals corresponding to said first and second control outputs both have greater rates of change than said predetermined value.

12. Apparatus according to claim 9 further comprising means for detecting deviations between said first and second control outputs; and
    means for indicating when said deviation exceeds a predetermined limit.

13. Apparatus according to claim 10 wherein said change ratio detecting means is responsive directly to said first and second control outputs.

14. Apparatus according to claim 9 wherein said first control system includes bias means for adding a signal having a predetermined value to signals corresponding to the velocity of the rotating member to cause said first electrical control output to have said value to control the operation of the rotating member at said slightly lower velocity.